United States Patent [19]

Bove et al.

[11] 4,001,543
[45] Jan. 4, 1977

[54] APPARATUS FOR A LASER WELDING OF A PIPELINE, PARTICULARLY SUITABLE FOR APPLICATION ON PIPE-LAYING SHIPS

[75] Inventors: Ottavio Bove, San Donato Milanese; Galeazzo Grossi, Spino D'Adda, both of Italy; David William Kirkley, Kingston upon Thames, England

[73] Assignees: Saipem S.p.A., Milan, Italy; BOC Limited, London, England

[22] Filed: Apr. 11, 1975

[21] Appl. No.: 567,107

[30] Foreign Application Priority Data

Apr. 11, 1974 Italy .................................. 21279/74
Mar. 13, 1975 Italy .................................. 21222/75

[52] U.S. Cl. ........................... 219/121 L; 61/111; 29/200 P; 350/7

[51] Int. Cl.² ...................................... B23K 26/00

[58] Field of Search ... 219/121 L, 121 LM, 121 EB, 219/121 EM, 59, 60 R, 60 A; 61/72.1, 72.5; 29/33 T, 200 J, 200 P, 429, 469; 350/7, 81, 82, 84, 85, 289, 299; 228/4.1, 44.5

[56] References Cited

UNITED STATES PATENTS

| | | | |
|---|---|---|---|
| 2,780,376 | 2/1957 | Sanders | 61/72.1 X |
| 3,324,275 | 6/1967 | Peignen | 228/4.1 X |
| 3,387,761 | 6/1968 | Pickard | 29/200 P X |
| 3,454,740 | 7/1969 | Foulquier et al. | 219/121 EM |
| 3,483,352 | 12/1969 | Schollhammer | 219/121 EM |
| 3,618,845 | 11/1971 | Totten | 278/44.5 |
| 3,749,878 | 7/1973 | Sullivan et al. | 219/121 L |
| 3,764,056 | 10/1973 | Edwards et al. | 228/4.1 |
| 3,772,753 | 11/1973 | Sargeant | 29/200 P |
| 3,839,775 | 10/1974 | Hirose et al. | 29/200 P |

*Primary Examiner*—J. V. Truhe
*Assistant Examiner*—G. R. Peterson
*Attorney, Agent, or Firm*—Ralph M. Watson

[57] ABSTRACT

Apparatus which may be mounted upon a lay barge to weld an end of a pipe spool to an end of a pipeline used under water, includes a stand fixed to the pipeline to support and secure its outer end, a pipe spool support which may hold a spool in coaxial relationship with the pipeline and with one end abutting the outer end of the pipeline, a laser positioned to direct a beam of coherent radiation along the axis of the pipeline, a reflection system including a mirror mounted for movement through an arc of 360° in the path of the laser beam to reflect that beam radially on the abutting ends of the pipeline and pipe spool, and a laser energy source for generating a beam of sufficient intensity to weld together the abutting ends of the pipeline and the pipe spool.

26 Claims, 14 Drawing Figures

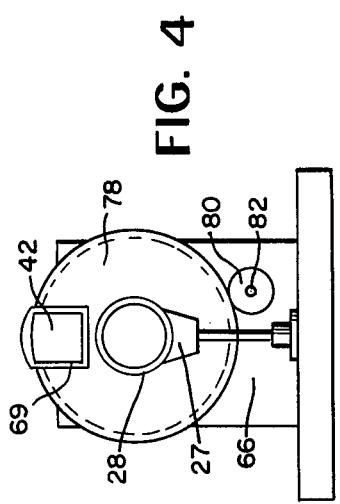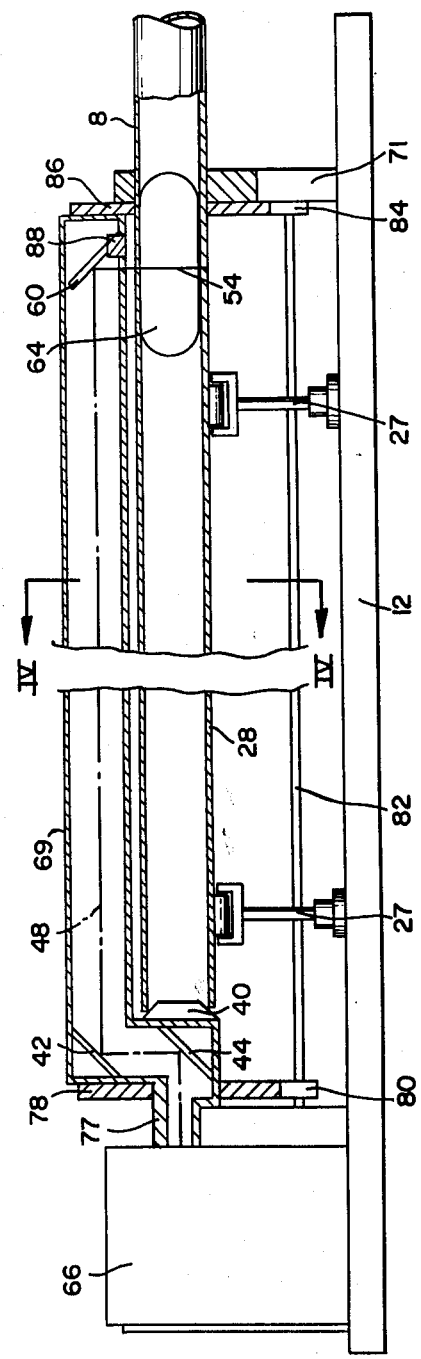

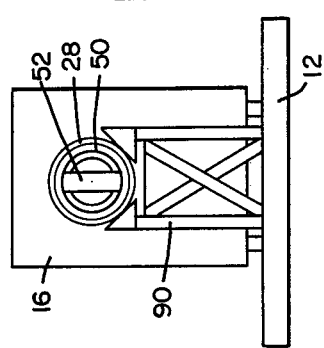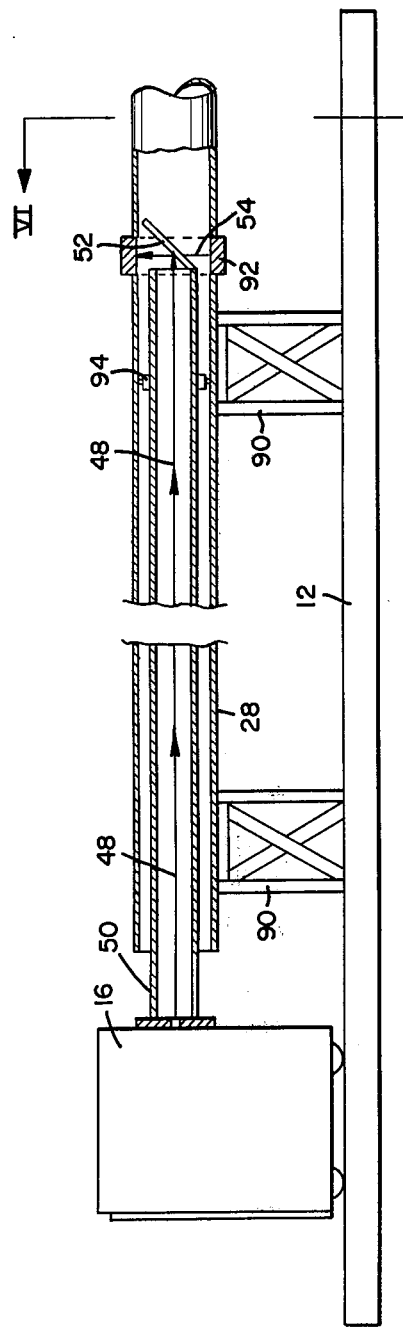

APPARATUS FOR A LASER WELDING OF A PIPELINE, PARTICULARLY SUITABLE FOR APPLICATION ON PIPE-LAYING SHIPS

This invention relates to apparatus for enabling pipe spools of large diameter carbon steel to be welded together in succession to form a pipeline.

The pipeline can be intended for use under water, or it can be used for transporting oil or other liquid overland. In the former case the welding apparatus is mounted on a lay barge or like sea-going vessel, while in the latter case it can be mounted on a land-borne wheeled platform.

The welding apparatus of the present invention is particularly suitable for application on pipe-laying ships, insofar as it not only reduces to a considerable extent the time required to lay a pipeline on the sea bed, but it also enables a shorter deck to be used on a pipelaying ship than is conventional, in that only one welding station is required, or alternatively, pipe spools longer than is the present convention can be welded together.

It is generally known that assembly by welding of prefabricated parts, such as pipe spools, has to be done with precision and with minimum distortion of the parts being welded if it is desired to preserve, or prevent the deterioration of, the welded workpieces, to minimize the need for finishing operations and, in consequence, to make the work cycle more economic. It is also necessary, especially in cases where a welded pipeline is to be placed by a ship on the sea bed, for the welding operation to be carried out with the greatest possible speed, in order to reduce idle time to a minimum and to suffer as little delay as possible due to adverse weather conditions.

Apparatuses currently used in welding carbon steel pipelines employ arc or forge welding and require a weld filler material. Consequently, they all have either operational or economic disadvantages. More significantly, arc or forge welding causes the isotherm of the melting point to spread through the carbon steel of the pipe spools in all directions, with resulting heat loss, distortion of the spool and modification of its micrographic structure.

These structural modifications are caused by the necessary use of a weld filler material which always undergoes a thermal cycle different from that of the workpiece being welded. Furthermore, welding which uses a weld filler material always requires several passes, and leads to an increase in the time taken to complete a weld. Thus, in the particular case of a pipeline to be laid on the sea bed by a ship on board which the successive pipe sections (spools) are welded to the pipeline, the fact that the welding has to be carried out in several passes means that the work has to be spread over several welding stations at each of which one welding pass is made: as a result, only short pipe spools can be used because the ships deck where the welding is carried out is necessarily of limited length.

The present invention aims at eliminating the above-mentioned disadvantages, and accordingly provides a welding apparatus which makes it possible to obtain a uniform weld and to reduce substantially the time required for welding carbon steel pipes together, in particular for pipelines to be placed on the sea bed by a pipelaying vessel.

These advantages are achieved by using as the welding agent a laser beam from a laser source having a power output great enough to weld together carbon steel pipes having a high yield point and of considerable thickness.

Accordingly the present invention provides welding apparatus which is as claimed in the appended claims.

By using a laser beam as the welding agent, the use of a weld filler material can be eliminated, and the abutting pipe ends can be welded together in a single pass, so that the number of welding stations required for joining pipe spools together can be reduced to one only. In addition, the welding operation is made more economic, as the amount of heat required is no longer dispersed but is concentrated into a greatly-reduced area close to the ends of the pipes being welded, thus causing virtually no distortion of the pipes. Furthermore, the use of movable mirrors in the path of the laser beam enables the beam to be manipulated and directed at the joint to be welded, keeping the somewhat heavy and cumbersome laser source static in a convenient position. Finally, the apparatus of the present invention makes the welding of large diameter pipelines quicker, simpler, more precise and more economic than with known apparatus, producing a weld of better quality and more uniformity.

The present invention also enables a pipe spool to be welded to a pipeline from the inside as well as from the outside of the spool: in the first case the laser beam is directed in a straight line along the axis of the pipe spool, while in the second case it is directed along an angled path so that it passes over the pipe spool and reaches the abutting ends from the outside.

The present invention will now be described in more detail with reference to the accompanying drawings which illustrate different ways of using the welding apparatus of the present invention in practice.

The drawing illustrate the invention only by way of example, and are not limiting. In the accompanying drawings:

FIG. 3 is a cross-sectional view of a second form of welding apparatus of the present invention;

FIG. 4 is a sectional view along the line IV—IV of FIG. 3;

FIG. 5 is a cross-sectional view of a third form of welding apparatus of the present invention;

FIG. 6 is a sectional view on the line VI—VI of FIG. 5;

Figure 1:
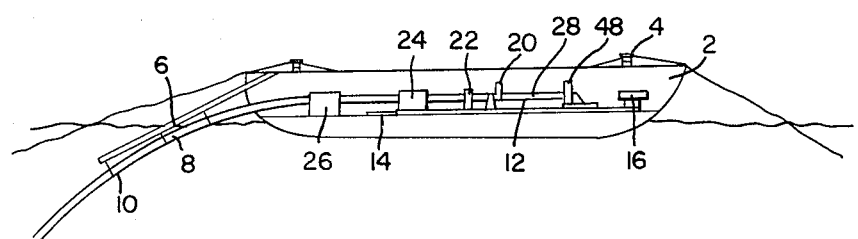
FIG. 1 is a diagrammatic view of a pipelaying vessel carrying welding apparatus of the present invention.

When the welding apparatus of the present invention is to be used for welding a pipeline intended to be positioned on the sea bed, the welding operation is carried out on a sea-going vessel known as a lay barge 2. This is a vessel not having its own means of propulsion but which is provided with a relatively-large number of winches 4 each of which is connected to an anchor (not shown). The anchors are laid out fore and aft of the barge 2 along the intended path of the pipeline. The barge is moved along this path during the pipelaying operation by pulling in the chains leading to the forward anchors, and allowing the chains leading to the rearward anchors to pay out. The tensions in the different chains are adjusted so that the position of the barge at any time is accurately controlled and is known with precision. The motors driving the winches, the controls therefor and the lockers for the anchor chain have been omitted from the drawing for clarity.

Projecting rearwardly and downwardly from the barge 2 is an extension 6 known as a stinger.

This is adapted to support the pipeline 8 leaving the barge so that the pipeline is constrained to move in a path of chosen shape. This is to prevent the pipeline from being damaged by being bent through too small a radius of curvature. The supports 10 extending from the stinger are adapted to move relatively to the pipeline so that as the latter is paid out from the stern of the barge during the welding process the weight of the pipeline is taken at several widely-spaced locations so as to avoid placing any localised excessive strain on the pipeline.

The welding apparatus of the present invention is largely intended to be mounted internally of the barge on a platform 12 which is mounted on rails 14 so that the platform is able to move longitudinally of the barge. The purpose of this is to prevent the sea-induced movement of the barge from being transmitted to the welding apparatus and interfering with the adjustment thereof. For this purpose the critical parts of the welding apparatus are secured to the platform, and the platform is in turn clamped to the inboard end of the pipeline so that the welding apparatus is fixed relative to the pipeline and not to the barge 2.

The platform 12 carries a laser 16, a headstock 18, a device 20 at the welding station, a clamp 22 and a radiographic crack-detector 24. Normally associated with the welding apparatus, but not necessarily mounted on platform 12, is a plant 26 for coating the pipeline after welding with bitumen and/or other protective materials.

The laser 16 has to have a power output sufficient to effect fusion welding to an adequate depth of a material such as carbon steel. One particularly-suitable laser for this purpose is one having an output of coherent radiation in the infra-red portion of the spectrum, and is one which uses carbon dioxide as the lasing medium. For its operation, the laser 16 has to be supplied with electrical energy, with various gases (including carbon dioxide) and with cooling waters.

The sources of these consumables, and the means by which they are supplied to the laser as necessary, have been omitted from the drawing for clarity.

The headstock 18 is adapted to support that end of the pipe spool 28 which is to form the outer end of the pipeline 8 formed by the previously-welded and aligned series of pipe spools. More details of the construction on the headstock are shown in other Figures of the drawings and will be described below.

The device 20 at the welding station includes means for supporting the inner end of the pipe spool 28 so that it is coaxial with the adjacent end of the pipeline 8. Similarly to the headstock 18, further details of the device 20 are given in the following description and other drawings.

The clamp 22 is movable with the platform 12 and is adapted to be clamped firmly to the external surface of the welded pipeline so that the platform 12 is constrained to follow the movements of the pipeline along its axis relative to the barge. The lateral movement of the barge and pipeline do not affect the correct working of the welding apparatus of th present invention, and so much movements can be accommodated.

Insofar as the clamped end of the pipeline is constrained to move laterally of the pipeline axis with movement of the barge, the platform 12 is in effect fixed in space relative to the pipeline end. This ensures that, once the welding apparatus has been set up, its subsequent working is not affected by normal sea-induced movements of the barge 2.

The radiographic apparatus 24 is mounted in the platform 12 so that any crack or other flaw in the weld remains stationary relative to the apparatus, and therefore more-easily detectable than if relative movement were permitted, despite movement of the barge 2.

Figure 2:
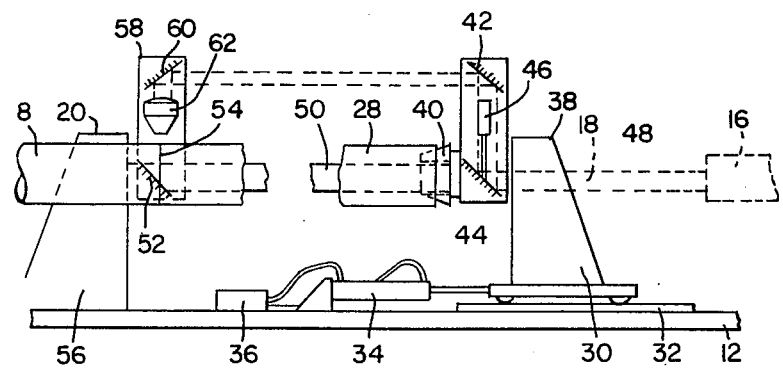
FIG. 2 is a side view of one form of welding apparatus of the prsent invention.

The apparatus shown in FIG. 2 is intended to be used for making internal or external welds to weld together the abutting ends of pipe spool 28 and pipeline 8. To this end, the headstock 18 comprises a stand 30 mounted on rails 32 on platform 12. The rails are substantially parallel with the axis of pipeline 8. The position of support 30 relative to platform 12, and therefore with respect to the pipeline, is controlled by a double-acting hydraulic ram 34 connected to a control device 36. The source of pressure fluid for ram 34 has been omitted from the drawings for clarity.

The support 30 carries a rotary arm 38 and a stationary centring device 40. At its outer end, the arm 38 carries a front-silvered mirror 42, and at its inner end, where it intersects the axis of pipeline 8, a front-silvered mirror 44. The position of mirror 44 is controlled by an hydraulic ram 46 which is indicated only digrammatically. The ram 46 is able to move the mirror 44 to such an extent that in one limit position no part of the mirror 44 lies in the beam 48 from laser 16, whereas in the other limit position (as shown) the mirror intercepts the whole of laser beam 48. The arm 38 is able to be rotated by a motor positioned internally of support 30 so that the mirrors 42 and 44 are able to traverse through 360° while maintaining their relative alignment. The alignment is such that the beam reflected from mirror 42 is normally parallel to the beam 48 incident on mirror 44, but this is not essential.

The centring device 40 carried by support 30 is in the form of a hollow member having an external frusto-conical surface, of which the minumum diameter is less than the inside diameter of the pipe spool 28, and of which the maximum diameter is greater than the inside diameter of the spool. This ensures that the device 40 is able to be introduced within the respective end of the spool 28. When the ram 34 is energised in the appropriate direction, the centring device acts to lift the outer end of spool 28 until the axis of the spool is coaxial with that of the pipeline 8, and it also is effective to exert a significant force along the axis of the spool to force the other end of the spool into abutting exgagement with the inboard end of pipeline 8.

Projecting from the rotary arm 38 is tube 50 which passes through the interior of the hollow frusto-conical member 40 and extends coaxially of spool 28. The tube 50 at its other end carries a front-silvered mirror 52, the mirror being positioned such that the laser beam 48 reflected from it is able to fall on the join 54 between the abutting pipe ends. To enable this to happen, the tube 50 is provided with an aperture (not shown) to enable the radiation to pass from the interior of tube 50 and fall on the join 54.

The device 20 at the welding station is similar to device 18, in what it includes a support 56 carrying a rotary arm 58 carrying, in turn, a front-silvered mirror 60. Mirror 60 is positioned so as to have incident on it the radiation from mirror 42. After reflection, the radiation from mirror 60 is intended to fall on a lens device 62. This takes the form of a housing having one wall formed by, or including, a shaped body of material which is able to refract the laser beam so as to bring it to a focus on, or in the region of, join 54.

According to a preferred feature of the present invention, the interior of housing 62 is intended to be supplied with a suitable gas, such as argon, intended to issue from the device 62 as a stream directed at the welding zone, the gas being inert so that it shields the weld puddle from attack by the atmosphere until after the weld puddle has cooled sufficiently to be immune from such attack. A similar lens and gas-shielding device 62 would preferably be positioned in the interior of the pipeline and spool, being secured to the tube 50, but this has again been omitted from the drawing for clarity. In cases where the device 62 is provided in the interior of the pipeline, it would be appreciated that the shielding gas for the device is supplied by way of the tube 50 and headstock 18.

By means which are not further described in the specification, but which do not themselves form part of the subject-matter of this invention, the arm 58 is intended to be rotated by a motor in support 56 in exact synchronism with arm 38. This is to ensure that the laser beam reflected from mirror 42 is always incident on mirror 60 and, from there, on the join 54 to be welded.

It will be appreciated that the support 30 is hollow or otherwise shaped, to enable the laser beam 48 to be incident directly on either mirror 44 or mirror 52.

It will thus be seen that the welding apparatus shown in FIG. 2 is able to be used, with equal facility, for effecting internal or external fusion welds. In both cases, it is necessary to provide means for adjusting the apparatus so that the laser beam 48 is brought to a focus on, or in the region of, the join 54.

For making internal welds, it will be necessary to provide for slight movement of support 30, and with it tube 50, relative to centring device 40. In this way, irrespective of device 40, the tube 50 can be moved axially until the beam is focussed accurately on join 54 from the inside. For external welds, the arm 58 can be made adjustable along its rotary axis to alter the position of mirror 60 relative to the external join 54.

In the apparatus shown in FIG. 2, and in all the other forms of the apparatus, the laser beam emitted from laser 16 is unfocused, i.e. its energy is distributed over a relative-large area. In this case, the beam is brought to a focus on the join 54 to be welded, as by means of the refractive lens included in device 62. However, it is within the scope of the present invention to use a laser beam which is initially focussed, so that it is transmitted as a parallel beam of very small cross-sectional area, and therefore having a very high energy density. In this case the refractive lens could be dispensed with, but it might still be necessary or useful to use a device 62 to direct a stream of inert shielding gas at the weld puddle.

The welding apparatus shown in FIGS. 3 and 4 is designed to operate similarly to the device shown in FIG. 2, but for effecting external welds only.

In these figures, and in others of the drawings, these parts common to FIG. 2, have been given the same references.

At the region of the join 54, the pipe spool 28 is aligned with the clamped end of pipeline 8 by means of an internal coupler 64 which may be in the form of a pneumatic bag holding the two parts aligned coaxially. The axial forces holding the abutting ends in engagement with each other at join 54 are supplied by means of a combined laser and headstock device 66. Mounted on the device 66 is one end of a tubular arm 69 having its other end carried by a support 71 which is similar in function to device 20. The tubular arm 69 carries the mirrors 44, 42 and 60 by which the beam is reflected from its original path coaxial with the axis of spool 28 and is arranged to fall substantially radially and externally on join 54. The laser beam 48 reaches the interior of tubular arm 69 through a hollow axle 77 forming part of the device 66. The axle 77 carries a gear wheel 78 which is fast with arm 69 and which meshes with a gear wheel 80 coupled, by means of a shaft 82, to a second gear wheel 84 meshing with a large gear wheel 86 fast to the other end of arm 69 and rotatably supported on support 71. The function of this arrangement is to ensure that the arm 69 moves as a unit around the pipe spool 28, without being flexed or distorted by being driven from one end only.

The mirror 60 is mounted on a carriage 88 which is movable in parallel with the axis of the pipeline 28, along the interior of arm 69. This provides for axial adjustment of the point on which the beam reflected by mirror 60 falls on the join 54 through an aperture in the wall of arm 69.

The pipe spool 28 is lifted to a position where its axis is coaxial with that of pipeline 8 by means of hydraulic jacks 27, which are then removed since the spool is supported in said position by a frusto-conically shaped centring device 40 and by the said internal clamp 64 respectively.

The sectional view shown in FIG. 4 illustrates how the tubular arm 69 is able to pass completely around the pipe spool 28 so as to effect an external weld in one or more circular passes.

The welding apparatus as shown in FIGS. 5 and 6 is designed to effect internal welds only.

For effecting internal welds only, the pipe spool 28 to be welded is supported in suitable fashion, such as by the trestles 90 illustrated, or adjustable supports such as hydraulic jacks. The pipe spool 28 is temporarily secured to the respective end of pipeline 8 by means of an external clamp 92.

This is effective both to hold the two members together and coaxial with each other, and to act also as a dam to hold the bottom of the weld puddle in place while it solidifies. This latter function would normally be necessary because the radial thickness of the pipes being welded together to ensure that the abutting ends are completely fused together. In order to ensure against leaving any unfused portions, it would normally be prudent to ensure that the depth of the puddle would be greater than the radial thickness of the pipe, if there were additional material allowing this radial extension of the weld puddle. However, in its absence, the clamp 92 becomes heated and acts as a damming shoe.

Projecting from the mobile laser source 16 is a rotary tube 50, carrying at one end a mirror 52 which is angled so as to direct radially-incident coherent radiation on the join 54 between the abutting pipe ends. Projecting outwardly from one end of tube 50 is a series of antifriction supports 94 adapted to bear on the inner surface of spool 28 and to provide mechanical support to the inner end of tube 50 as it is rotated. This ensures that the laser beam 48 extends along the axis of the spool 28.

The laser source is movable axially of the pipeline to permit insertion of tube 50 in the pipe spool after the latter has been positioned and secured to the pipeline 8. To this end, the laser 16 is mounted on rails (not shown) mounted on platform 12. The position of the source 16 is adjustable accurately so as to ensure that the laser beam, after reflection from mirror 52, falls precisely on the join 54 so as to affect the necessary fusion weld.

Similarly to the welding apparatus shown in other figures, the tube 50 can be rotated completely through 360° so as to effect the necessary fusion weld in one or more complete circular passes.

Figure 14:
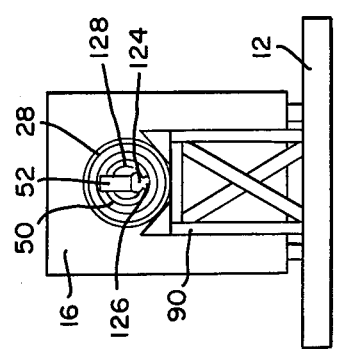
FIG. 14 is a sectional view on the Line XIV—XIV of FIG. 13.
Figure 13:
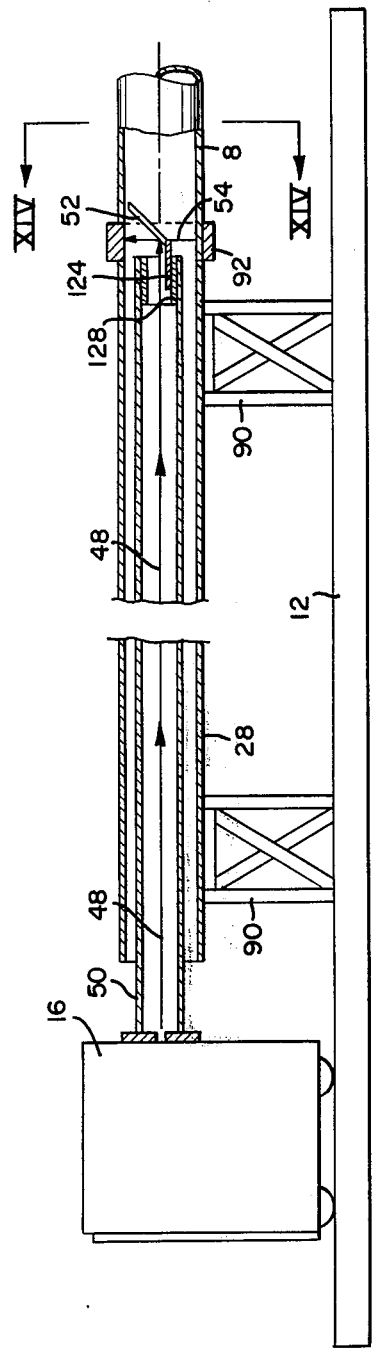
FIG. 13 is a cross-sectional view of yet another form of welding apparatus the present invention.

The welding apparatus shown in FIGS. 13 and 14 is similar to the one shown in FIGS. 5 and 6. In this apparatus, however, tube 50 is rigidly fastened to mobile Laser source 16 and mirror 52 is carried at the free and of said tube by a carriage 124 which is movable in parallel with the axis of the pipe spool 28 along a dovetailed guide 126 (see FIG. 14) presented by a ring 128 which, in its turn, can be rotated by an electric motor around the axis of the said pipe spool, said ring being rotatably supported inside tube 50. In this way the axial shifting of carriage 124 provides for axial adjustment of the point on which the Laser beam reflected by mirror 52 falls on the join 54, while the rotation through 360° of ring 128 and consequently of mirror 52 allows the necessary fusion weld to be made.

Figure 7:
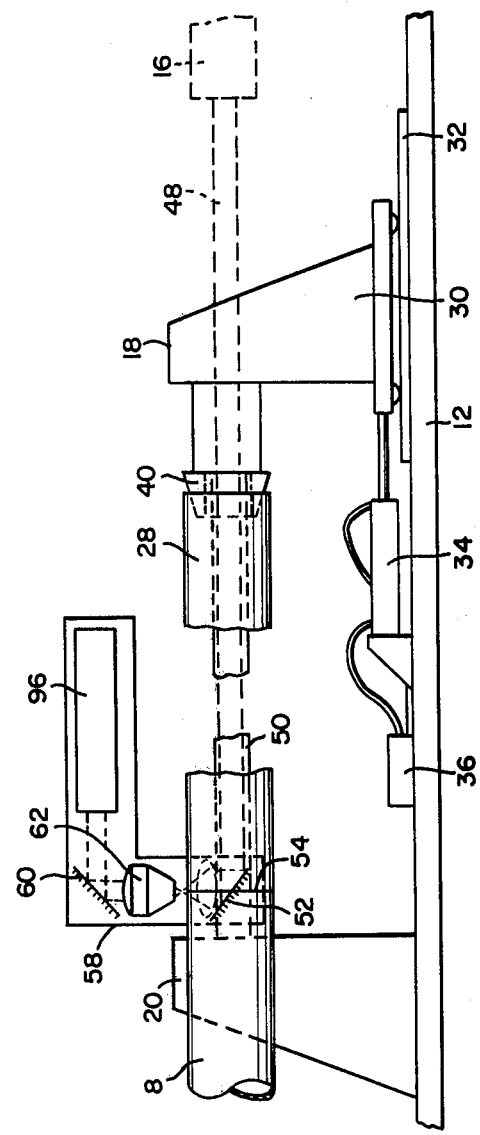
FIG. 7 is a diagrammatic view of yet another form of welding apparatus of the present invention.

The welding apparatus shown in FIG. 7 is a modification of that shown in FIG. 2. It is primarily intended to effect internal and external welds either concurrently or consecutively. For this purpose it employs two lasers in the form of the static laser 16 and a mobile laser 96 secured to the rotary arm 58 of the support 20 at the welding station. The supplies of electricity, cooling water and gas for the mobile (or rotary) laser 96 are supplied by way of the support 20 in a manner which does not form part of the subject-matter of this application, and which is therefore not described herein in any further detail.

As already mentioned, the centring device 40 is movable axially relatively to tube 50, which is fast with support 30. This ensures that the free end of the pipe spool 28 is engaged and supported by the centring device 40 while the longitudinal position of tube 50, and with it mirror 52, can be adjusted relatively to the join 54 to be welded by energisation of the ram 34.

It will be seen from the drawing that as the arm 58 is rotated, the radiation from laser 96 is able to effect an external weld, while that from laser 16 is able to affect an internal weld by rotation of mirror 52. The two welds may be made either concurrently or consecutively. In addition, even if the welding processes are being carried out concurrently, the internal and external weld puddles can be displaced angularly, from each other, by appropriate adjustment of the relative angular positions of arm 58 and tube 50. These relative angular displacememts may be constant or varying. In other words, particularly when the mobile laser 96 has a considerable-lower energy output then that of laser 16, it might be necessary for the arm 58 to move around the join to be welded at a slower speed then the speed of rotation of tube 50. What it is necessary to ensure is that the weld puddles produced by both laser beams either meet or overlap to ensure that there are no unfused portions of the originally-abutting end faces of the pipes. This means that the speeds of rotation of arm 58 and tube 50 are related to the energy output of the associated laser and hence to the penetration depth of the laser beam or weld puddle.

Figure 8:
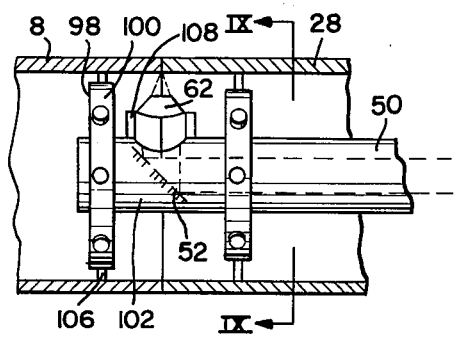
FIG. 8 is a view, part in section and part in elevation, of an internal clamp for the two pipe ends being welded.
Figure 9:
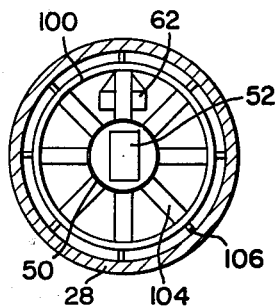
FIG. 9 is a view along the line IX—IX in FIG. 8.

FIGS. 8 and 9 show different view of one possible form of internal clamp for holding the abutting ends of the pipe spool 28 and pipeline 8 in engagement with each other while an internal weld is made. The clamp, indicated generally by reference 98, includes basically two rings 100 having an outside diameter smaller than the inside diameter of the pipes to be welded. Extending coaxially of the rings is a tubular elongation 102 and the inner surface of each ring 100 is a series of angularly-positioned hydraulic rams 104. The pistons 106 of the rams extend through openings in the rings 100 and project sufficiently beyond the external surfaces thereof to be able to bear on the inner surface of the associated spool 28 or pipeline 8. The hydraulic fluid supply lines, and the control equipment for the rams, have been omitted from the drawing for clarity. In accordance with the present invention, the rams may be controlled selectively or in combination.

Although the spool 28 are intended to be circular, as supplied from the factory, or after trasnport and storage, the spools can be distorted so that the cross-sections of their ends are elliptical or otherwise depart from being truly circular. This comment can apply to either end, or both ends, of each spool. The clamp 98 shown in FIGS. 8 and 9 enables these distortions to be removed before the welding process. This is done by appropriate energisation of the rams 104, which are strong enough to force the respective end of the pipeline or spool to assume a truly-circular shape before and during the welding operation.

It can also happen that, because of manufacturing tolerances, the inner diameters of the spools are different from each other. In such a case, the clamp 98 can be used to expand radially the member of smaller inner diameter until the two dimensions are equal to each other. This would be done by common energisation of the appropriate set of rams. It will be appreciated that the clamp 98 can be controlled so as to effect both correcting operations at the same time, i.e. to make both ends truly circular and of the same radius. However, the means by which the hydraulic rams 104 are controlled so as to bring about these desired results do not form part of the subject-matter of this invention, and so will not be described herein in any further detail.

The only other feature worthy of comment in FIG. 8 is the means by which the lens and gas shielding device 62 is positioned on tube 50, by extensions 108, internally of the pipe sections to be welded together.

Figure 10:
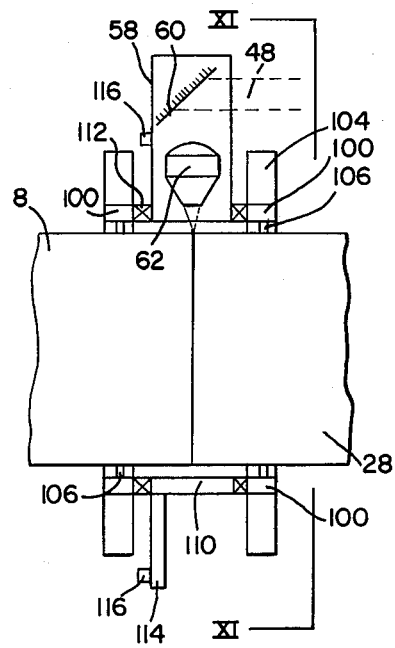
FIG. 10 is a side elevation of one form of external clamp for holding the two pipe ends to be welded.
Figure 11:
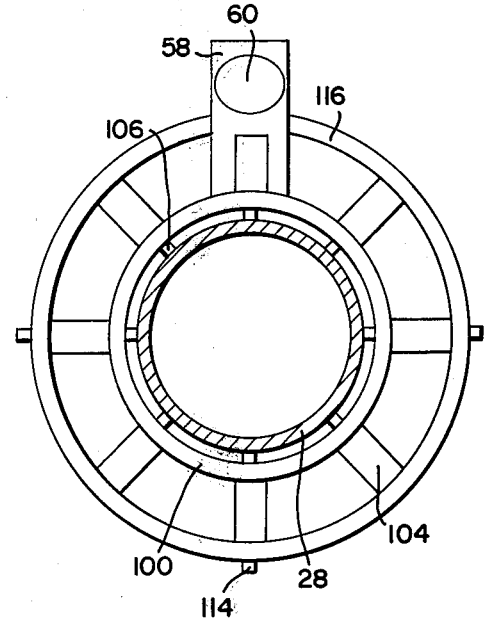
FIG. 11 is a view along the line XI—XI of FIG. 10.

FIGS. 10 and 11 show the converse of FIGS. 8 and 9, in that they illustrate an external clamp 108. This likewise includes two rings 100, but this time having an inner diameter greater than the outer diameter of the pipe sections 28. Each of the rings carries an angularly-spaced series of hydraulic rams 104. The pistons 106 from the rams extend through the rings 100 and bear on the outer surfaces of the spool 28 and pipeline 8. Extending between the rings is a collar 110 which is secured to the rings by bearings 112. The collar 110 thus acts to ensure that the rings 100 have a common axis, so that the external clamp 108 can be used to align the spool 28 and pipeline 8. Projecting from collar 110 is the rotary arm 58 already described in connection with FIG. 2 or FIG. 7. The collar 110 also supports, as by means of projections 114, a circular rack 116 adapted to be engaged by a pinion (not shown) driven by a motor mounted in support 20. In this way the arm 58 is able to be rotated about the pipeline end through 360° without any member of the external clamp 108 intercepting the laser beam 48, or in any way preventing correct operation of the welding apparatus.

Similarly to the internal clamp 98, the hydraulic rams 104 can be operated either selectively or in unison to restore either spool 28 or pipeline 8 to its desired truly-circular cross section, or to apply a radial compression force to one or other pipe section to make them of the same size, or to apply both forms of correction.

The external clamp shown in FIGS. 10 and 11 may of course be used in conjunction with a rotary laser 96 such as is shown in FIG. 7.

Figure 12:
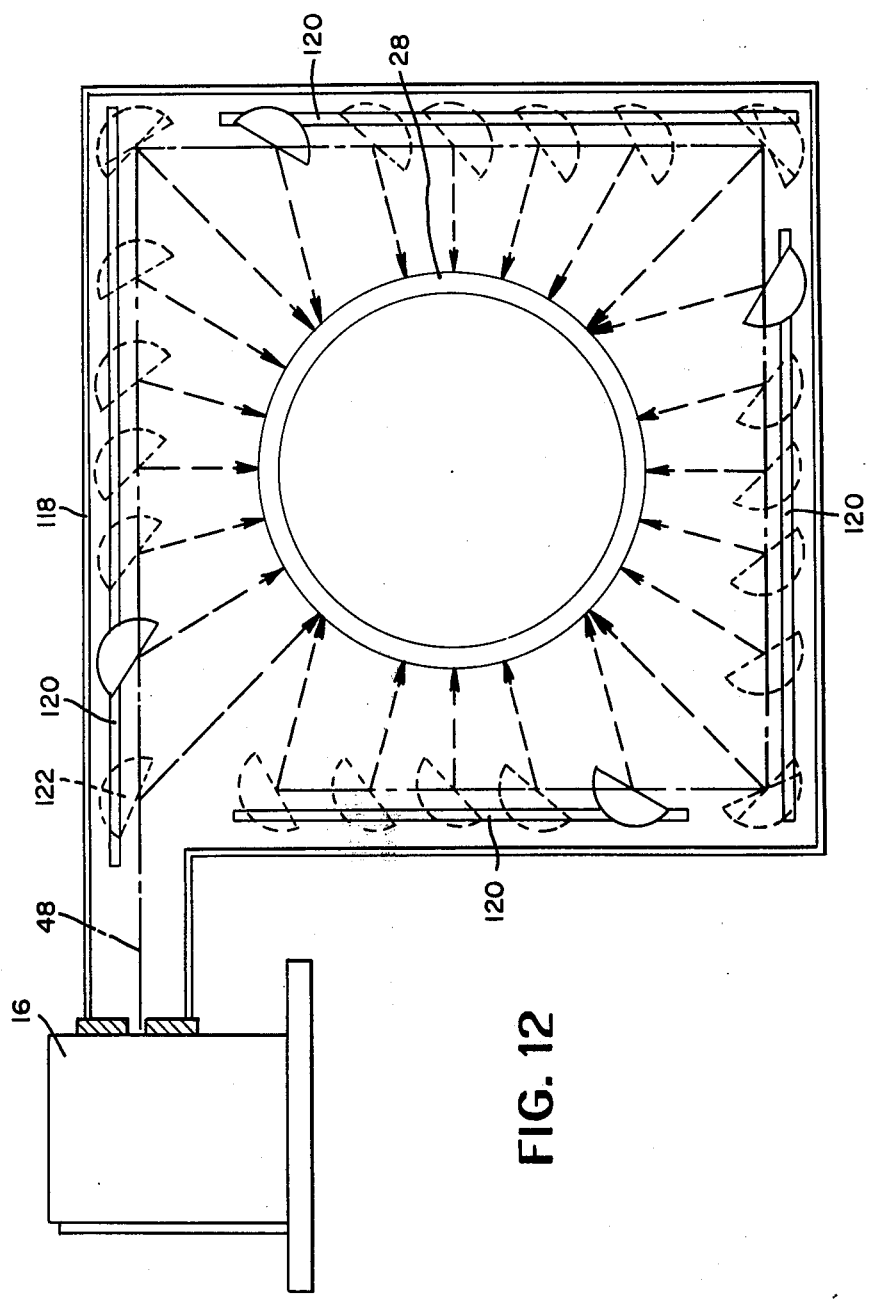
FIG. 12 is a view of yet another form of welding apparatus of the present invention.

The welding apparatus shown in FIG. 12 uses a stationary laser 16 to effect an external weld only. In contrast to the other welding apparatus shown, the beam from laser 16 is adapted to be in the plane containing the join 54 between the abutting end faces to be welded together. The beam 48 from laser 16 is adapted to enter a housing 118 encircling the pipe sections (8 or 28) to be welded together. The housing 118 contains four slides 120, each positioned to one side of the path of the laser beam 48. Each slide carries a movable mirror 122. By means which are not shown in the drawing, each of the mirrors 122 is able to be driven at a desired speed along its slide while at the same time being pivoted. The angle which the mirror adopts at any position along its slide is related to the direction of the incident laser beam 48 so that the laser beam, after reflection from the respective mirror, is incident substantially radially on the workpiece 28.

It will be appreciated that, because the mirrors 122 occupy a finite volume, it is not possible for the mirrors to trace out a path which subtends completely through 360°. Therefore each of the slides 118 is not able to effect an external weld substending a complete angle of 90° by falling completely radially on the join to be welded. It is therefore necessary for each of the mirrors 122, towards the end of its movement along the respective slide 118, to be pivoted by an amount such that the reflected beam does not fall completely radially on the workpiece. The degrees of pivoting movement of the mirrors are adjusted so that the different sections of weld beed formed by a reflection from the mirrors in succession are continuous.

At the end of its movement away from the laser 16 along the respective slide 118, each mirror is pivoted quickly through an angle such that the reflected beam falls on the mirror associated with the next slide. Thereafter, the first mirror remains fixed in this position during the rest of the welding process. Each of the four mirrors 122 is moved both longitudinally and angularly in succession, until a point is reached where the fourth mirror is reflecting the laser beam on to the point where the first mirror started its weld.

Although the present invention has been described as being applied to apparatus for effecting complete fusion welds by means of a laser beam only, it is within the present invention for the laser welding process to be supplemented by a conventional welding process. Thus for example, the abutting ends of the pipe sections could be tack-welded together prior to their being laser welded. Additionally, or alternatively: the pipe sections could be welded from the inside only by means of a conventional welding technique, such as manual or semi-automatic welding. In the latter case, MIG or TIG welding could be used, or the welding could be carried out using an unshielded (open) arc. Because the addition of a conventional welding technique does not involve any alteration of the apparatus described in the accompanying drawings, such techniques will not be described in any further detail in this specification.

In addition to pure fusion welding, a weld filler material could also be used. It is not thought that this would be necessary in the case of laser welding, but the supplementary welding process, if used, could include the use of filler material. If it were decided that the weld made by the laser beam could be enhanced by the addition of a suitable filler material, then modification could be made to the illustrated welding apparatus to enable filler material in a suitable form to be supplied to the welding zone. Preferably the weld filler material would be supplied in the form of wire which would be fed along its length by means of an electric meter and would be guided to its site of application, as by means of a tube or other guide. Because such modification of the apparatus is thought not to involve the exercise of inventive ingenuity, such means for applying weld filler material is not shown in the drawings or described in any greater detail herein.

The present invention has been described as using a carbon dioxide laser, in that this currently is the only form of commercial laser thought to have the necessary continuously-rated energy output. One of the disadvantages of the radiation produced by the carbon dioxide laser is that it lies in the infra-red portion of the optical spectrum, and is therefore not visible. This makes it difficult to adjust the focussing of the welding operation, by altering the optics of the system acting on the laser beam. In accordance with a feature of the present invention, the laser, or any laser of the welding apparatus, is supplemented by an auxiliary laser adapted to produce coherent radiation laying in the visible part of the optical spectrum. This auxiliary laser is adapted to project its beam along the beam of the carbon dioxide laser, so that the apparatus can be initially adjusted using only the auxiliary laser and viewing the welding zone, by any appropriate means, so as to determine when the optical system is correctly adjusted. Thereafter the auxiliary laser is deenergised and the carbon dioxide energised when it is desired to weld.

Accurate alignment of the laser beam with the join 54 can be ensured during the welding process by using a seam-tracking device. This can be of the mechanical sort, using a point or like device for following the seam, and controlling the point at which the laser beam is focussed on the join, or alternatively an optical system can be used to view the join in the region of the weld puddle so that the weld puddle is caused to move accurately along the path of the join. The seam-tracking devices are known in themselves, and as the application of them to laser welding does not appear to require the exercise of inventive inguenity, they are not described any further herein in this specification.

As shon in FIG. 1, it is generally convenient for the welding operation for the spool to be welded to the pipeline while in the horizontal position. Because the pipeline when laying on the sea bed is also substantially horizontal, this means that the pipeline after the welding operation has to move from the barge to the sea bed along on ogee curve. This necessity for the pipeline to band successively in two opposite directions places a strain on it, and particularly on the welded joins.

According to another feature of the present invention, this difficulty can be overcome by elevating the platform 12, shown in FIG. 1, at an angle to the horizontal. This angle can be such that the pipe is assembled in a single curve, thus reducing the stresses on it as it passes from the lay barge to the sea bed. The manner in which the platform is raised and maintained at its desired angle and position relative to the pipeline, despite the normal sea-induced movements of the barge, do not in themselves form part of the subject-matter of this invention and so will not be described herein in any further detail. Various concomitant changes would have to be made for securing the different pieces of welding apparatus to the platform 2, and to connecting them to the necessary supplies of electricity, gases and cooling water, but these are thought to be within the competence of the relevant technical people and so will not be described in any further detail in this specification.

It will thus be seen that the present invention provides apparatus for ensuring the rapid and accurate welding of pipe spools to a pipeline. It thus permits the rapid formation of pipelines to be laid underwater, and thus makes best use of the working time available between spells of adverse weather conditions. It has been found that the welding apparatus of the present invention can be used to make a circumferential weld 0.8 metres in length in two minutes, which is a significantly-shorter time period than with conventional manual welding techniques. When the weld has been made, the barge can be caused to move relatively to the pipeline to bring the other end of the newly-welded spool into alignment with the wellding station to enable it to be welded to a new spool. This part of the welding process can be carried out in less than one minute. It will thus be seen that at least 20 spools per hour can be added to the pipeline. For spools measuring 12 metres in length, the welding apparatus of the present invention allows 240 metres of pipeline to be formed each hour.

Because only one welding station is needed for carrying out single-pass or multi-pass welding operations, involving internal or external welds or both, it can be seen that for a lay barge of conventional length the welding operation is not related to the axial length of the substitution of one welding station for the several welding stations used in known pipelaying operations enables pipe spools of considerably-greater length than 12 metres to be used to form the pipeline. Because the length of the spool, but only to its circumferential length, the use of longer spool leads to the formation of longer lengths of pipeline per unit period.

What is claimed is:

1. An apparatus for welding a pipe spool to a pipeline from the inside and/or from the outside of the pipe spool to be welded, particularly suitable for application on pipelaying ships or barges, which apparatus comprises a stand fixed relative to the pipeline for supporting and securing one end of the pipeline; means for aligning a pipe spool with the secured pipeline end and for maintaining one end of the spool in contact with the pipeline end; means for holding the axis of the spool coaxial with that of the pipeline; at least one laser source arranged to direct a beam of coherent radiation along the axis of the pipeline, and means for rotating at least one reflecting surface positioned in the path of the beam so that the laser beam, after reflection from the surface falls substantially radially on the abutting pipe ends and is caused to make at least one complete revolution about the pipeline axis, the energy of the beam being such that it is able to weld the abutting pipe ends together by fusion.

2. A welding apparatus according to claim 1, wherein a laser source, is movable relative to the pipeline end on rails extending substantially parallel with the axis of the pipeline, and the said means for rotating the reflecting surface comprise a laser beam guiding tube to be inserted into the pipe spool, which tube is axially rotatably supported at one end by the same movable laser source and which rigidly suppoorts at its other end the said reflecting surface.

3. A welding apparatus according to claim 1, wherein a laser source is movable relative to the pipeline end on rails extending substantially parallel with the axis of the pipeline, and the said means for rotating the reflecting surface comprise a laser beam guiding tube to be inserted into the pipe spool, which tube is rigidly fastened at one end to the movable laser source and supports at the other free end the said reflecting surface, the latter being carried by a carriage which is movable in parallel with the axis of the said pipe spool along a dovetailed guide presented by a ring which, in its turn, can be rotated by an electric motor around the axis of the said pipe spool, said ring being rotatably supported inside the said tube.

4. A welding apparatus according to claim 1, wherein the said means for aligning a pipe spool with the secured pipeline end and for maintaining one end of the spool in contact with the pipeline end comprise a hollow frusto-conical member having a minimum diameter smaller than the inside diameter of the spool and a maximum diameter greater than the inside diameter of the spool, said member being adapted to be moved along the pipeline axis and pressed into the other end of the spool by means of one or more fluid-pressure-operated devices.

5. A welding apparatus according to claim 1, wherein the said means for holding the axis of the pipe spool coaxial with that of the pipeline comprise an external clamp constituted by two rings having an inner diameter greater than the outer diameter of the pipes to be welded, said rings being connected to each other by means of a rotatable collar supporting a rotary arm for a second laser source and/or a reflecting surface, and presenting a set of radially-aligned hydraulic rams whose pistons extend through openings in said rings and which are able to bear on the outer surface of the said pipe spool and pipeline respectively.

6. A welding apparatus according to claim 1, wherein a laser source is adapted to produce a beam of unfocussed radiation having a relatively-low energy density, and wherein the apparatus includes means for bringing the unfocussed beam to a focus on the abutting pipe ends.

7. A welding apparatus according to claim 1, wherein a laser source is adapted to produce radiation at a wavelength in the infra-red portion of the optical spectrum.

8. A welding apparatus according to claim 1 including an auxiliary laser source adapted to produce radiation having a wavelength in the visible portion of the optical spectrum, means being provided for making the beam from the auxiliary laser source substantially coaxial with a beam from another laser source over the final portion of its path, to assist in setting up the welding apparatus by visual inspection.

9. A welding apparatus according to claim 1 which is mounted on a platform movable on rails extending substantially parallel with the axis of the pipeline, said rails being mounted on a pipe-laying ship or barge.

10. An apparatus for welding a pipe spool to a pipeline from the outside of the pipe spool to be welded, according to claim 1 said apparatus including a laser source arranged to direct a beam of coherent radiation in the plane containing the joint between the abutting pipe ends to be welded together, wherein the said beam from laser source is adapted to enter a housing encircling the said joint and containing four slides, each positioned adjacent to said housing, along which slides reflecting surfaces are successively moved and pivoted so as to reflect the beam from the laser source substantially radially on all the points of said joint, each reflecting surface being pivoted at the end of its movement away from laser source along the respective slide in such a way that the reflected laser beam falls on the reflecting surface associated with the next slide.

11. A welding apparatus according to claim 1, wherein a laser source is fixed relative to the pipeline end and the said means for rotating said reflecting surface comprise a laser beam guiding tube to be inserted into the pipe spool, which tube is axially rotatably supported at one end by a second stand having in it a passage for the laser beam, said stand being movable on rails extending substantially parallel with the axis of the pipeline, the said tube rigidly supporting at its other end the said reflecting surface.

12. A welding apparatus according to claim 11, wherein the said second stand is controlled by a double-acting hydraulic ram connected to a control device, and the said beam guiding tube is rotated by means of an electric motor supported by the said second stand.

13. A welding apparatus according to claim 1, including a second reflecting surface selectively positionable in the path of the laser beam for causing the latter to fall on a third reflecting surface adapted to be rotated in a closed path laying outside the external diameter of the pipe spool, the laser beam, after reflection from said third surface, falling on a fourth reflecting surface laying substantially in the plane of the abutting pipe ends, and externally thereof, all the said surfaces being adapted to be rotated in unison so that the laser beam is able to make at least one complete revolution around the pipeline axis and to effect an external weld.

14. A welding apparatus according to claim 13, wherein the said second reflecting surface is selectively positioned in the path of the laser beam by means of a hydraulic ram supported by the said one rotary arm.

15. A welding apparatus according to claim 13, wherein a single rotary arm carries the second, third and fourth reflecting surfaces.

16. A welding apparatus according to claim 13, wherein the position of each of the reflecting surfaces is adjustable relative to its respective support or mounting.

17. A welding apparatus according to claim 13, including a second laser source fixed relative to the pipeline end; at least a second reflecting surface positioned in the path of the beam of the second source for causing said beam to fall on a third reflecting surface adapted to be rotated in a closed path laying outside the external diameter of the pipe spool, the laser beam, after reflection from said third surface, falling on a reflecting surface laying substantially in the plane of the abutting pipe ends, and externally thereof, all the said surfaces being adapted to be rotated in unison so that the laser beam is able to make at least one complete revolution around the pipeline axis, the arrangement being such that the laser beam from the first laser source is adapted to weld from the inside, and the laser beam from the second laser source is adapted to weld from the outside, of the abutting pipe ends.

18. A welding apparatus according to claim 17, wherein the said second and third reflecting surfaces are carried by one rotary arm rotatably supported by the said second stand, while the fourth reflecting surface is carried by a second rotary arm rotatably supported by the said fixed stand, the two motors being electrically coupled together so that the said two arms rotate in the same direction and at the same speed as each other.

19. A welding apparatus according to claim 17, wherein the two laser sources have significantly-different energy outputs, whereby the depth of weld produced by one laser source is significantly greater than that produced by the other.

20. A welding apparatus according to claim 1, including a second laser source which is mobile relative to the pipe ends, said second laser source being adapted to be rotated about the pipeline axis, and at a distance therefrom greater than the outside diameter of the pipeline, the beam from the mobile laser source being adapted to impinge substantially radially on the abutting pipe ends either directly or after reflection.

21. A welding apparatus according to claim 20, wherein the mobile second laser source is carried by a rotary arm rotatably supported by the said fixed stand, said arm carrying in its turn a reflecting surface positioned in the path of the beam from the mobile laser and adapted to reflected said beam so that it falls substantially radially on the abutting pipe ends at all angular positions of the arm relative to the pipeline axis.

22. A welding apparatus according to claim 1, wherein the said means for holding the axis of the pipe spool coaxial with that of the pipeline comprise an internal clamp constituted by two rings having a outside diameter smaller than the inside diameter of the pipes to be welded, said rings being rigidly connected to each other and presenting a set of radially-aligned hydraulic rams whose pistons extend through openings in said rings and which are able to bear on the inner surface of the said pipe spool and pipeline respectively.

23. A welding apparatus according to claim 22, wherein means are provided for energising either selectively or in combination the said hydraulic rams of the clamp so as to make the cross-section of the end of the spool or pipeline truly circular.

24. A welding apparatus according to claim 22, wherein means are provided for energising either selectively or in combination the said hydraulic rams of the clamp so as to stretch or compress the associated end of the spool or pipeline to give it a circular section of a desired size.

25. A welding apparatus according to claim 1, including means for supplementing a weld made by a laser source by a weld made by welding technique.

26. A welding apparatus according to claim 25 in which the conventional welding technique involves the use of a filler material.

* * * * *

UNITED STATES PATENT AND TRADEMARK OFFICE
CERTIFICATE OF CORRECTION

PATENT NO. : 4,001,543
DATED : January 4, 1977
INVENTOR(S) : Ottavio Bove, et al It is certified that error appears in the above-identified patent and that said Letters Patent are hereby corrected as shown below:

Column 2, line 38, Correct "drawing" to read --drawings--.

line 45, Correct spelling of "present".

line 66, After "apparatus" insert --of--.

Column 4, line 13, Before "present" correct spelling of --the--.

line 14, Correct "much" to read --such--.

Column 5, line 3, Before "tube" insert --a--.

Column 8, line 39, Correct spelling of "transport".

Column 11, line 7, Correct spelling of "shown".
Column 12, line 27, correct spelling of "supports"
Column 16, line 5, before "welding" insert -- a conventional --.

Signed and Sealed this

Thirteenth Day of September 1977

[SEAL]

Attest:

RUTH C. MASON
Attesting Officer

LUTRELLE F. PARKER
Acting Commissioner of Patents and Trademarks